Figure 1:
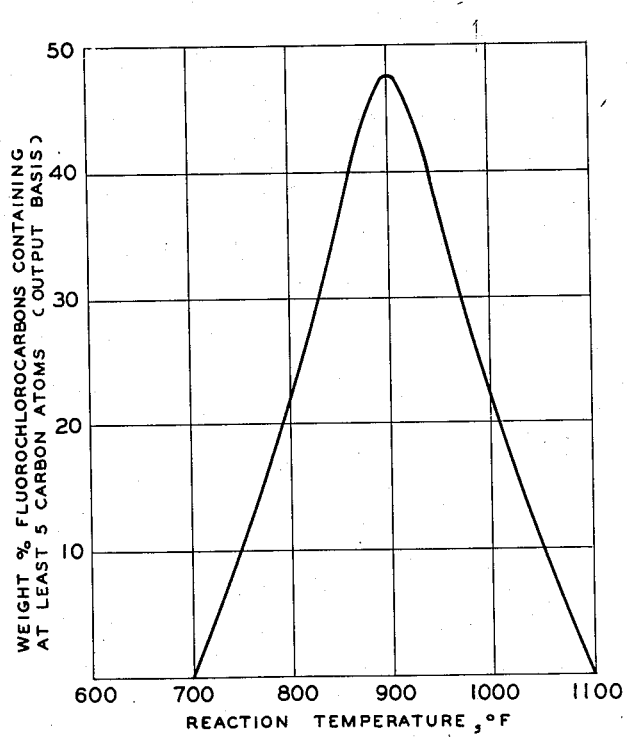

INVENTORS
HERBERT J. PASSINO
WILBER O. TEETERS
RUSSELL M. MANTELL
BY *G. H. Palmer*
*J. C. Virgil*
ATTORNEYS Patented Feb. 23, 1954

2,670,389

UNITED STATES PATENT OFFICE 2,670,389

MANUFACTURE OF HALOCARBONS

Herbert J. Passino, Englewood, Wilber O. Teeters, River Edge, and Russell M. Mantell, Orange, N. J., assignors to The M. W. Kellogg Company, Jersey City, N. J., a corporation of Delaware Application November 23, 1951, Serial No. 257,734

17 Claims. (Cl. 260—653)

This invention relates to an improved process, and more particularly pertains to an improved method for producing halocarbons. Still more particularly, this invention is concerned with improvements in the manufacture of halocarbons by means of a fluid system.

The reaction of fluorine with carbon in the presence of a halogen other than fluorine produces a mixture of halocarbons of various molecular weights. The presence of a halogen other than fluorine, such as for example, chlorine, appears to favorably influence the rate of reaction and makes possible a better control of reaction conditions than is obtained when reacting fluorine and carbon alone. Halocarbons can be used for a variety of purposes, particularly those halocarbons which contain at least 5 carbon atoms in the molecule. Such compounds are usually referred to as higher halocarbon products and they can be used as additives in lubricating oils, as solvents, as refrigerants, extraction agents for improving the quality of lubricating oils, transformer and dielectric oils, hydraulic fluids, etc. There is an unlimited use for halocarbons and it is important to provide methods for producing same in substantial quantities and for the lowest cost. The present invention is concerned with providing an improved process for producing halocarbons.

It is an object of the present invention to provide an improved process for manufacturing halocarbons.

Another object of this invention is to provide a fluid system for producing halocarbons.

Still another object of this invention is to provide an improved method for producing fluorochlorocarbons.

Other objects and advantages of this invention will become apparent from the following description and explanation thereof.

It is contemplated in accordance with the present invention to provide a process comprising the reaction of fluorine with carbon in the presence of an inorganic metal halide and a halogen other than fluorine. In a more particular aspect, the process is conducted by maintaining a fluid mass of finely divided carbon particles for the reaction described above.

Another aspect of the present invention is concerned with the production of halocarbons containing at least 5 carbon atoms in the molecule by the method comprising the reaction of fluorine with carbon in the presence of an inorganic metal halide and a halogen other than fluorine and at a temperature of about 700° to about 1100° F.

The reaction of fluorine with carbon in the presence of an inorganic metal halide and a halogen other than fluorine is especially adapted for producing halocarbons, particularly fluorohalocarbons. The reaction can be carried out by employing the carbon as a lump, pelleted, granular or finely divided material. It is to be noted, however, that a system involving fluidized carbon is exceptionally better than any other method for effecting the reaction. A fluid system affords better control of the temperature and more uniform reaction conditions than is possible with other systems. The reaction between carbon and fluorine is highly exothermic, hence any system in which the reactants become unevenly distributed over the reaction zone tends to develop "hot spots" or regions in the reaction zone having unusually high temperatures. Excessive temperatures are to be avoided, because any product materials subjected to same tend to decompose. Furthermore, any compounds which may be produced in the high temperature zones may differ from what is sought, thus resulting in lower yields of desired product.

To attain a fluid system the carbon reactant is utilized in a finely divided state, generally having a particle size of about 5 to about 250 microns, more usually about 10 to about 100 microns. The carbon particles are fluidized by passing gaseous materials upwardly through a mass thereof, the velocity of which is sufficient to suspend the particles so that it behaves as a pseudo-liquid. Generally, depending on the size of the carbon particles, a superficial linear gas velocity of about 0.1 to 50 feet per second, more usually about 0.1 to 6 feet per second is employed. The larger and more dense particles requiring the higher velocities and the opposite being true for the smaller and less dense particles. A linear gas velocity of the order mentioned will produce either a lean or dense phase. The lean phase involves a lean concentration of particles suspended in a gaseous material, thus resulting in low fluid densities. On the other hand, the dense phase or bed is a heavier concentration of suspended particles. For the present reaction, the dense phase is preferred because it provides a more intimate contact between the particles and the gaseous materials.

A fluid bed is unusually adapted for the present invention because it provides more uniform temperatures and better control. The carbon particles in the fluid bed are in random, circulatory motion. The particles move in every direction, thus resulting in a continuous circulation or mixing throughout the bed. As a result, there is a tendency for uniform temperatures to exist in the bed. A fluid bed is also conducive to rapid restoration of equilibrium conditions, once the system has been upset or disturbed.

In some instances, it is preferred not to rely solely upon the reactant gas materials as the fluidizing medium. An inert gas can be employed to supplement the gaseous reactant materials for producing the proper fluidization of the carbon particles. The inert gas can serve a two-fold purpose, namely, of aiding in the fluidization of the carbon particles and as a cooling medium. In some instances, the latter feature may be very important, hence, it would be desirable to employ an inert gas which contains a high specific heat, so that a small quantity can be used to effect the desired temperature control. The inert gases which are useful for this purpose can be any gaseous material which is substantially inert under the conditions of reaction. In this respect, generally the inert gases include helium, nitrogen, neon, etc. Generally, about 1 to 1000 cubic feet (measured at 60° F. and 760 mm.-standard conditions), preferably about 10 to 100 standard cubic feet of inert gas per cubic foot of fluorine are employed.

The use of halogen other than fluorine in the reaction has the apparent effect of reducing the velocity of reaction between fluorine and carbon. This is a beneficial effect in view that the reaction between fluorine and carbon takes place at a high rate accompanied by the liberation of large amounts of heat. It is also noted that the product contains mixed halocarbons. These mixed halocarbons can be used essentially for the same purpose as the fluorocarbons. For this invention ordinarily about 5 to about 90%, preferably about 20 to about 60%, of fluorine based on the total volume of fluorine and a halogen other than fluorine are employed. In such relative proportions, the reaction between fluorine and carbon takes place in a manner which readily lends to control. Although the halogen other than fluorine may be used in larger amounts than fluorine, the products produced usually contain more fluorine than the other halogen.

In practicing our invention, the quantity of carbon employed is preferably in excess of the stoichiometric amount required to react with all of the fluorine present. By maintaining the quantity of fluorine at low concentrations relative to the amount of carbon, the reaction will proceed at a reasonably fast rate; but at the same time, the fluorine concentration is not sufficient to cause the liberation of unusually large quantities of heat. Accordingly, for the purposes of this invention, about 0.001 to about 1.0 cubic foot (measured at 60° F. and 760 mm.) of fluorine per minute per pound of carbon is generally used, preferably about 0.01 to 0.10 cubic foot of fluorine per minute per pound of carbon.

The halogen other than fluorine which is used in the reaction can be, for example, chlorine, bromine or iodine or mixtures of two or more of the foregoing. The halogen which is used, ordinarily will be found chemically combined in some or all of the compounds in the product, although in some cases the opposite is true. The volume per cent of fluorine in the halogen gas mixture is in the range of about 5 to about 65 in producing compounds containing at least 5 carbon atoms in the molecule. Quantities of fluorine outside of this range result in little or negligible production of high boiling materials. This phenomenon will be discussed in more detail below, along with the data showing this characteristic of the reaction.

The improvements of the present invention are obtained by conducting the reaction in the presence of a catalyst which is an inorganic metal halide. The reaction of halogen with carbon is substantially improved with respect to yields of halocarbons when using the inorganic metal halide as catalyst. This catalytic material can be employed in quantities of about 0.1 to about 20%. The amount used generally depends upon the product distribution and yields desired. A concentration of at least about 8% by weight of the catalytic material, based on the carbon, provides higher yields of halocarbons than from the use of lower catalyst concentration. This effect may be obtained with catalyst concentrations of about 8 to about 12%, based on the weight of the carbon. Concentrations higher than 12% can be used, however, it is not preferred, because there is a tendency for the catalyst to deposit on the walls of the reaction vessel causing corrosion, etc. The inorganic metal halides include the fluorides, chlorides, bromides and iodides of any metal. Examples of such catalytic materials are the halides of copper, silver and gold in group I, the halides of zinc, cadmium and mercury in group II, and the halides of iron, cobalt and nickel in group VIII. More specific illustrations of these catalysts are mercuric chloride, cobalt chloride, silver chloride, cupric chloride, zinc chloride, copper bromide, zinc bromide, mercuric bromide, mercuric iodide, etc.

The carbon reactant can be any material which furnishes carbon under reaction conditions and is substantially free of hydrogen. The absence of hydrogen is preferred, because under reaction conditions, there is a tendency for any free hydrogen to combine with the halogen and cause a reduction in product yield. Ordinarily, the carbon can be derived from such materials as charcoal, graphite, coke, etc. The charcoals appear to react more satisfactorily with halogen than any other carbon-yielding material. In this respect, the charcoal can be derived from wood, sugar, or any other suitable carboniferous material. Furthermore, any carbon-yielding material which contains elements or compounds other than carbon, may present problems in the recovery of desired halocarbons and for such a reason they should be avoided.

In the present invention, the temperature at which the reaction occurs may be selected on the basis of the type of material sought. Ordinarily, the reaction of fluorine with carbon in the presence of an inorganic metal halide and a halogen other than fluorine is conducted at a temperature of about 200° to about 1100° F. This temperature range includes the temperature at which halocarbons containing at least 5 carbon atoms in the molecule, and/or the low boiling halocarbons are formed. To derive halocarbons having at least 5 carbon atoms in the molecule, a temperature in the range of about 700 to 1100° F. is used, otherwise, little or no yield of such materials is obtained. At these temperatures, the reactant materials are present under a subatmospheric, atmospheric or superatmospheric pressure. Usually, a pressure in the range of about 0.5 to about 10 atmospheres, preferably about 1 to about 3 atmospheres are used.

In order to provide a better understanding of the present invention, specific examples are given below. However, it should be understood that no undue limitations or restrictions are to be imposed by reason thereof.

Experiments were conducted on a laboratory scale in order to evaluate the conditions under which the reaction between carbon and fluorine should be conducted. The apparatus employed for this purpose consisted of a monel reactor having a diameter of approximately 1 inch and being 36 inches long. A small settling chamber, 6 inches in length and approximately 4 inches in diameter, was superimposed on the reactor tube and contained a porous sintered monel filter for the removal of entrained carbon particles from the effluent gaseous material. The filter was about 4 inches long and about 2 inches in diameter. Concentrically disposed within the filter and the reactor was a monel thermowell connected to the lower end of the filter by means of a sliding friction sleeve. This thermowell was approximately ¼" in diameter and 34 inches in length. The thermowell contained a sliding iron-constantan thermocouple, 36 inches in length. Within the bottom of the reactor there was provided a support consisting of a pervious monel plate upon which there rested a monel tube having the outside diameter slightly smaller than the internal diameter of the reactor and having a length of 1 inch. This tube was filled with a roll of 100 mesh nickel gauze. The nickel gauze permitted gases to pass through and distribute evenly over the cross-sectional area of the reactor. It also provides a means of supporting the carbon particles in the reactor. Located on the support, there was a ¼" x 4" monel sleeve in which the bottom end of the thermowell fitted. In this manner the thermowell was centered within the reactor. The filter, situated within the settling chamber, communicated with a Pyrex internal cold-finger liquid nitrogen trap having a 4 inch diameter and 20 inch length by means of external connection. The liquid nitrogen trap was connected to a Pyrex, graduated, Podbielniak distillation kettle of 50 mm. capacity. The kettle was maintained in a cooled condition by immersion in a Dewar flask containing liquid nitrogen. Heat was supplied to the reactor by external means through a 2500 watt electric jacket surrounding the same. Fluorine and inert gas were supplied to the bottom of the reactor by means of lines which were connected to suitable rotometers for measuring the gas rates. At the top of the reactor there was installed a suitable gauge for measuring the reaction pressure. All of the experiments conducted in this apparatus are held at atmospheric pressure.

In Table I below, there is reported the results obtained in determining the effect of temperature on the yield of halocarbons containing at least 5 carbon atoms in the molecule.

Table I

| Example No. | Charge [1] | Temperature of— | $Cl_2:F_2:N_2$ | Fluorine, Ft.³/Hr. | Yields, Wt. Percent (Output Basis) | |
|---|---|---|---|---|---|---|
| | | | | | $CF_3Cl$ | Fluorochlorocarbons containing at least 5 carbon atoms |
| 1 | Norite-Hg | 700 | 2:1:4 | .30 | Nil | Nil |
| 2 | ---do--- | 800 | 2:1:4 | .30 | 38 | 22 |
| 3 | ---do--- | 900 | 2:1:4 | .30 | 22 | 48 |
| 4 | ---do--- | 1,000 | 2:1:4 | .30 | 68 | 6 |
| 5 | ---do--- | 1,100 | 2:1:4 | .30 | 75 | 3 |
| 6 | ---do--- | 700 | 4:1:8 | .15 | Nil | Nil |
| 7 | ---do--- | 900 | 4:1:8 | .15 | 24 | 39 |

[1] Norite-Hg is 50 grams of 40-100 mesh Norite impregnated with 4 grams of $HgCl_2$.

The data given in Table I is also plotted in Figure 1 of the attached drawings. It is to be noted that in order to produce noticeable quantities of halocarbons containing at least 5 carbon atoms in the molecule, it is necessary to employ a temperature of about 700° to about 1100° F. Temperatures outside of this range result in the production of little or no halocarbons containing at least five carbon atoms. By means of Figure 1, the relationship between the temperature and the production of fluorochlorocarbons having at least five carbon atoms in the molecule clearly demonstrates that the temperature is a critical factor in this reaction. Furthermore, it should be noted that in Example 6 of Table I, the increase in chlorine concentration of the reactant gases did not have any apparent beneficial effect on the reaction as long as the temperature remained at 700° F., which is outside of the critical range. This fact is borne out by Example 7 in the same table, wherein the conditions remained the same except that the temperature was raised to 900° F. By so doing, it was observed that substantial yields of halocarbons both of the low molecular weight and of the higher molecular weight are obtained.

Another interesting phenomenon is that the production of chlorotrifluoromethane is favored by temperatures greater than the optimum temperature for producing the halocarbons containing at least five carbon atoms. In this regard, the light fluorochlorocarbon is produced in substantial quantities at a temperature above 900° F. and reaches a maximum at a temperature of about 1100° F. Hence, when it is desired to produce substantial quantities of trifluorochloromethane, the reaction should be conducted at a temperature of about 900° to about 1100° F. A temperature lower than this range can be used as is evident from the test using a reaction temperature of 800° F., however, optimum production is obtained at a temperature greater than 900° F.

Additional experiments were made to determine the effect of the catalyst in the production of halocarbons containing at least five carbon atoms in the molecule. These experiments are reported in Table II below.

*Table II*

| Example No. | Charge | Temperature, °F. | $Cl_2:F_2:N_2$ | Flourine, Ft.³/Hr. | Wt. Percent Fluorochlorocarbons 5 carbon atoms (output basis) |
|---|---|---|---|---|---|
| 1 | Norite-Hg [1] | 900 | 2:1:4 | .30 | 48 |
| 2 | Norite [2] | 900 | 2:1:4 | .30 | 28 |

[1] Norite-Hg is 50 grams of 40-100 mesh Norite impregnated with 4 grams $HgCl_2$.
[2] Norite is 50 grams of 40-100 mesh wood charcoal.

It is shown in Table II that the use of a catalyst effects a substantial increase in the yield of halocarbons, particularly those containing at least five carbon atoms in the molecule. It was observed that the reaction rate between carbon and fluorine is favored by the presence of an inorganic metal halide to the extent that substantial yields of fluorocarbons are obtained and the reaction is susceptible to much better control. This effect was believed to be due to the inorganic metal halide supplying halogen in a suitable form which causes the reaction between fluorine and carbon to slow down. As a result, it was believed that the presence of a halogen other than fluorine would have substantially the same magnitude of effect as the catalyst, if a comparable quantity of halogen were used in both instances. From the comparison in Table II, it can be seen that this is probably not the case, and quite unexpectedly, the use of a catalyst resulted in substantially improved yields. The effect of the catalytic material on the yield of halocarbons is out of proportion to what is expected on the basis that the catalyst material merely serves to supply halogen in a suitable form in reducing the velocity of the reaction between carbon and fluorine. In a copending application, S. N. 271,016, filed February 11, 1952, it is shown that the use of mercuric chloride as a catalyst results in the production of a fluorochlorocarbon when reacting fluorine and carbon alone. The loss of chlorine in the catalytic material appears to indicate strongly that such a material is not a catalyst in the true sense, but that it may behave as a moderator of the reaction between the carbon and fluorine. This phenomenon led some workers to believe that the inorganic metal halide merely functioned as a supplier of halogen. In view of the results obtained in Table II above, which show that the yield of fluorochlorocarbons containing at least 5 carbon atoms increases substantially by the addition of mercuric chloride to the reaction involving fluorine, chlorine and carbon, it now appears that the metal halide actually serves as a catalyst because the incremental increase in yield is not explainable on the basis that the metal halide furnishes halogen other than fluorine, and hence, moderates the reaction.

In Table III below, data is given which shows the results of employing various other materials as catalysts in the reaction of fluorine and carbon in the presence of a halogen other than fluorine.

*Table III*

| Example No. | Charge [1] | $Cl_2:F_2:N_2$ | Flourine, Ft.³/Hr. | Temperatures, °F. | Yields, Wt. Percent Output Basis | |
|---|---|---|---|---|---|---|
| | | | | | $CF_3Cl$ | Fluorochlorocarbons, 5 carbon atoms |
| 1 | Norite-$CuCl_2$ | 2:1:4 | .30 | 900 | 68 | 9 |
| 2 | Norite-$CoCl_3$ | 2:1:4 | .30 | 900 | 37 | 22 |
| 3 | Norite-$ZnCl_2$ | 2:1:4 | .30 | 900 | 28 | 41 |
| 4 | Norite-$HgCl_2$ [2] | 2:1:4 | .30 | 900 | 42 | 23 |

[1] 50 grams of 40-100 mesh Norite impregnated with 4 grams of catalyst salt.
[2] In this example, 8 grams of $HgCl_2$ were used.

The data in Table III clearly demonstrates that materials other than the mercury halides can be used as catalysts in producing halocarbons from the reaction of fluorine with carbon in the presence of a halogen other than fluorine. It is to be noted from the data in Tables II and III in columns 7 and 8, respectively, that the group II metal halides, viz., zinc chloride and mercuric chloride, employed in concentrations of 8% by weight based on the carbon produce exceptionally better yields of fluorochlorocarbons containing at least 5 carbon atoms than those instances in which the reaction is conducted without or with other types of catalysts including mercury chloride in a concentration of 16% by weight. This is a clear indication of the high selectivity that a group II metal halide in a concentration of less than 16% has for producing fluorochlorocarbons containing at least 5 carbon atoms. On the other hand, it is to be noted that those runs involving other catalysts, viz., cupric chloride and cobalt chloride including mercuric chloride (16% by weight based on carbon) have a high selectivity for producing trifluorochloromethane.

The data reported in Table IV below, illustrates the effect of the relative proportions of fluorine and a halogen other than fluorine on the yields of halocarbons.

Table IV

| Example No. | Charge [1] | Cl₂:F₂ | Nitrogen, ft.³/min. | Flourine, ft.³/hr. | Temperature, °F. | Yields, Wt. percent, Output Basis | |
|---|---|---|---|---|---|---|---|
| | | | | | | CF₃Cl | Fluorochlorocarbons, 5 carbon atoms |
| 1 | Norite-HgCl₂ | 2:3 | 1.2 | .30 | 900 | 64 | 10 |
| 2 | ----do---- | 2:1 | 1.2 | .30 | 900 | 22 | 48 |
| 3 | ----do---- | 4:1 | 1.2 | .15 | 900 | 24 | 39 |
| 4 | ----do---- | 5:1 | | .90 | 900 | 60 | 13 |

[1] 50 grams of 40–100 mesh Norite (wood charcoal) impregnated with 4 grams of HgCl₂.

Figure 2:
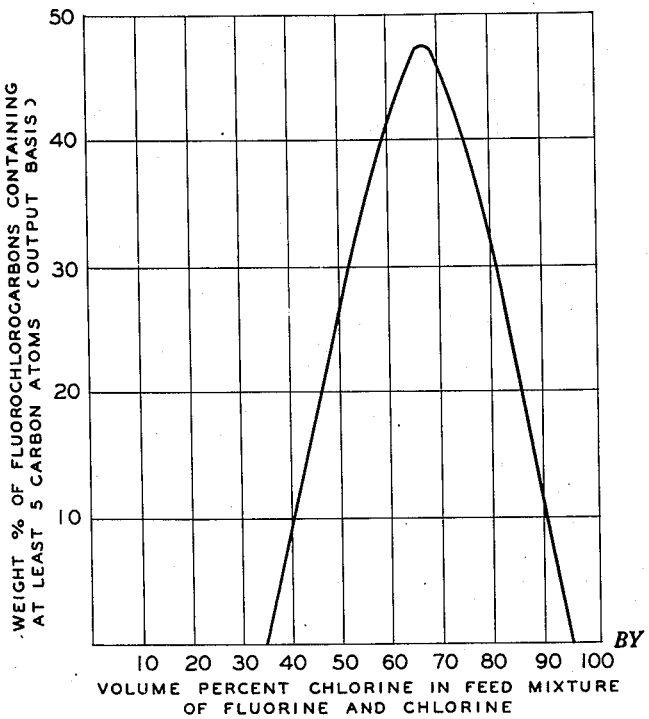

The relationship between the yields of halocarbons containing at least 5 carbon atoms in the molecule and the percentage of fluorine in the total mixture of fluorine and a halogen other than fluorine is plotted in Figure 2 of the attached drawings. This figure indicates that the yields of halocarbons containing at least 5 carbon atoms in the molecule are dependent upon the percentage of fluorine in the mixture of halogen gases. All of the experiments were conducted at a temperature of 900° F. which is shown by means of Table I to be the optimum temperature for producing the higher boiling halocarbons. Despite the use of this optimum temperature, it is noted from Figure 2 that the production of halocarbons having at least 5 carbon atoms in the molecule is dependent on certain percentages of fluorine in the reactant gas mixture. On the basis of Figure 2 in order to produce perhalocarbons having at least 5 carbon atoms in the molecule in noticeable quantities, it is necessary to employ 5% to about 65% of fluorine, based on the total volume of the mixture of fluorine and a halogen other than fluorine.

Having thus described my invention of giving specific illustrations thereof, it should be understood that the scope should be measured by the following claims.

We claim:

1. A process for preparing fluorohalocarbons containing at least 5 carbon atoms which comprises introducing fluorine and a halogen other than fluorine into a reaction zone in such amounts that fluorine constitutes about 5 to about 65% by volume of the two halogens, reacting the halogens with carbon in the reaction zone at a temperature of about 700° to about 1100° F., and in the presence of not more than about 12% of a group II metal halide.

2. The process of claim 1 wherein the halogen other than fluorine is chlorine.

3. The process of claim 1 wherein the halogen other than fluorine is bromine.

4. A process for preparing trifluorohalomethane which comprises introducing fluorine and a halogen other than fluorine into a reaction zone, reacting the halogens with carbon in the reaction zone at a temperature of about 700° to about 1100° F. and in the presence of a group IB metal halide.

5. A process for preparing trifluorohalomethane which comprises introducing fluorine and a halogen other than fluorine into a reaction zone, reacting the halogens with carbon in the reaction zone at a temperature of about 700° to about 1100° F. and in the presence of a halide of a group VIII metal having an atomic number not greater than 28.

6. The process of claim 4 wherein the halogen other than fluorine is chlorine.

7. The process of claim 5 wherein the halogen other than fluorine is chlorine.

8. A process for preparing trifluorohalomethane which comprises introducing a halogen other than fluorine and fluorine into a reaction zone, reacting the halogens with carbon in the reaction zone at a temperature of about 900° to about 1100° F. and in the presence of a group IB metal halide.

9. A process for preparing trifluorohalomethane which comprises introducing a halogen other than fluorine and fluorine into a reaction zone, reacting the halogens with carbon in the reaction zone at a temperature of about 900° to about 1100° F. and in the presence of a halide of a group VIII metal having an atomic number not greater than 28.

10. A process for preparing fluorohalocarbons containing at least 5 carbon atoms which comprises introducing fluorine and a halogen other than fluorine into a reaction zone in such amounts that fluorine constitutes about 5 to about 60% by volume of the two halogens, reacting the halogens with carbon in the reaction zone at a temperature of about 700° to about 1100° F. and in the presence of about 8 to about 12% of a group II metal chloride.

11. The process of claim 10 wherein the halogen other than fluorine is chlorine and the group II metal chloride is mercuric chloride.

12. The process of claim 10 wherein the halogen other than fluorine is chlorine and the group II metal chloride is zinc chloride.

13. A process for preparing fluorochlorocarbons containing at least 5 carbon atoms which comprises introducing chlorine and fluorine into a reaction zone in such amounts that the fluorine constitutes about 33% by volume of the two halogens, reacting the two halogens with carbon in the reaction zone at a temperature of about 900° F. and in the presence of about 8% of mercuric chloride.

14. A process for producing halocarbons which comprises introducing fluorine and a halogen other than fluorine into a reaction zone, and reacting the halogens with carbon in the presence of a metal halide.

15. A process for producing halocarbons which comprises introducing fluorine and a halogen other than fluorine into a reaction zone, reacting the halogens with carbon in the reaction zone at a temperature of about 200° to about 1100° F., and in the presence of a metal halide.

16. A process for producing halocarbons which comprises introducing fluorine and a halogen other than fluorine into a reaction zone in such amounts that fluorine constitutes about 5 to about 90% by volume of the two halogens, reacting the halogens with carbon in the reaction zone at a temperature of about 200° to about 1100° F., and in the presence of a metal halide.

17. A process for producing halocarbons which comprises introducing fluorine and a halogen other than fluorine into a reaction zone in such amounts that fluorine constitutes about 5 to about 90% by volume of the two halogens, reacting the halogens with carbon in the reaction zone at a temperature of about 700° to about 1100° F., and in the presence of about 0.1 to about 20% of a metal halide.

HERBERT J. PASSINO.
WILBER O. TEETERS.
RUSSELL M. MANTELL.

References Cited in the file of this patent

UNITED STATES PATENTS

| Number    | Name   | Date          |
|-----------|--------|---------------|
| 2,456,027 | Simons | Dec. 14, 1948 |

OTHER REFERENCES

Simons et al.: J. A. C. S. 61, pp. 2962–66 (1939).
McBee et al.: Oil and Gas J. 46, p. 59 (1947).